US011722003B2

United States Patent
Allert et al.

(10) Patent No.: US 11,722,003 B2
(45) Date of Patent: Aug. 8, 2023

(54) POWER CONVERTER AND METHOD FOR OPERATING A POWER CONVERTER

(71) Applicant: SMA Solar Technology AG, Niestetal (DE)

(72) Inventors: Claus Allert, Kaufungen (DE); Aleksandra-Sasa Bukvic-Schaefer, Kassel (DE); Harald Christian Benz, Flensburg (DE); Patrick Blair Reynolds, Charlotte, NC (US)

(73) Assignee: SMA Solar Technology AG, Niestetal (DE)

( * ) Notice: Subject to any disclaimer, the term of this patent is extended or adjusted under 35 U.S.C. 154(b) by 223 days.

(21) Appl. No.: 17/137,646

(22) Filed: Dec. 30, 2020

(65) Prior Publication Data

US 2022/0209572 A1    Jun. 30, 2022

(51) Int. Cl.
*H02M 7/44*    (2006.01)
*H02J 9/06*    (2006.01)
*H02M 3/04*    (2006.01)

(52) U.S. Cl.
CPC .............. *H02J 9/062* (2013.01); *H02M 3/04* (2013.01); *H02M 7/44* (2013.01)

(58) Field of Classification Search
CPC .... H02J 9/62; H02J 3/381; H02J 3/32; H02M 3/04; H02M 7/44
USPC .................................... 307/52; 327/104, 544
See application file for complete search history.

(56) References Cited

U.S. PATENT DOCUMENTS

| 9,966,761 B1 | 5/2018 | Kim et al. |
| 11,031,785 B1* | 6/2021 | Erokhovets ............ H02J 3/381 |
| 2016/0006254 A1 | 1/2016 | Bundschuh |
| 2016/0064936 A1 | 3/2016 | Satake et al. |
| 2017/0093162 A1 | 3/2017 | Inoue |

FOREIGN PATENT DOCUMENTS

WO    2019226081 A1    11/2019

OTHER PUBLICATIONS

International Search Report dated Mar. 30, 2022 for International Application No. PCT/EP2021/086476.

* cited by examiner

*Primary Examiner* — Hai L Nguyen
(74) *Attorney, Agent, or Firm* — Eschweiler & Potashnik, LLC

(57) ABSTRACT

A power converter with an inverter that is configured to transform electrical power between a DC-side of the power converter and an AC-side of the power converter, includes a first port operatively connected to an AC-grid, a second port operatively connected to an AC-load, a third port connected to an external power source, and a fourth port operatively connected to a rechargeable DC-power storage. The power converter includes a DC/DC-converter between the third port and the inverter, to transfer electrical power provided by the external power source from the third port to the inverter. The inverter is configured to be grid forming and provide electrical power to the second port upon a power supply outage at the first port, the power converter includes a control unit to monitor the third port and detect parameters of the electrical power provided via the third port.

20 Claims, 5 Drawing Sheets

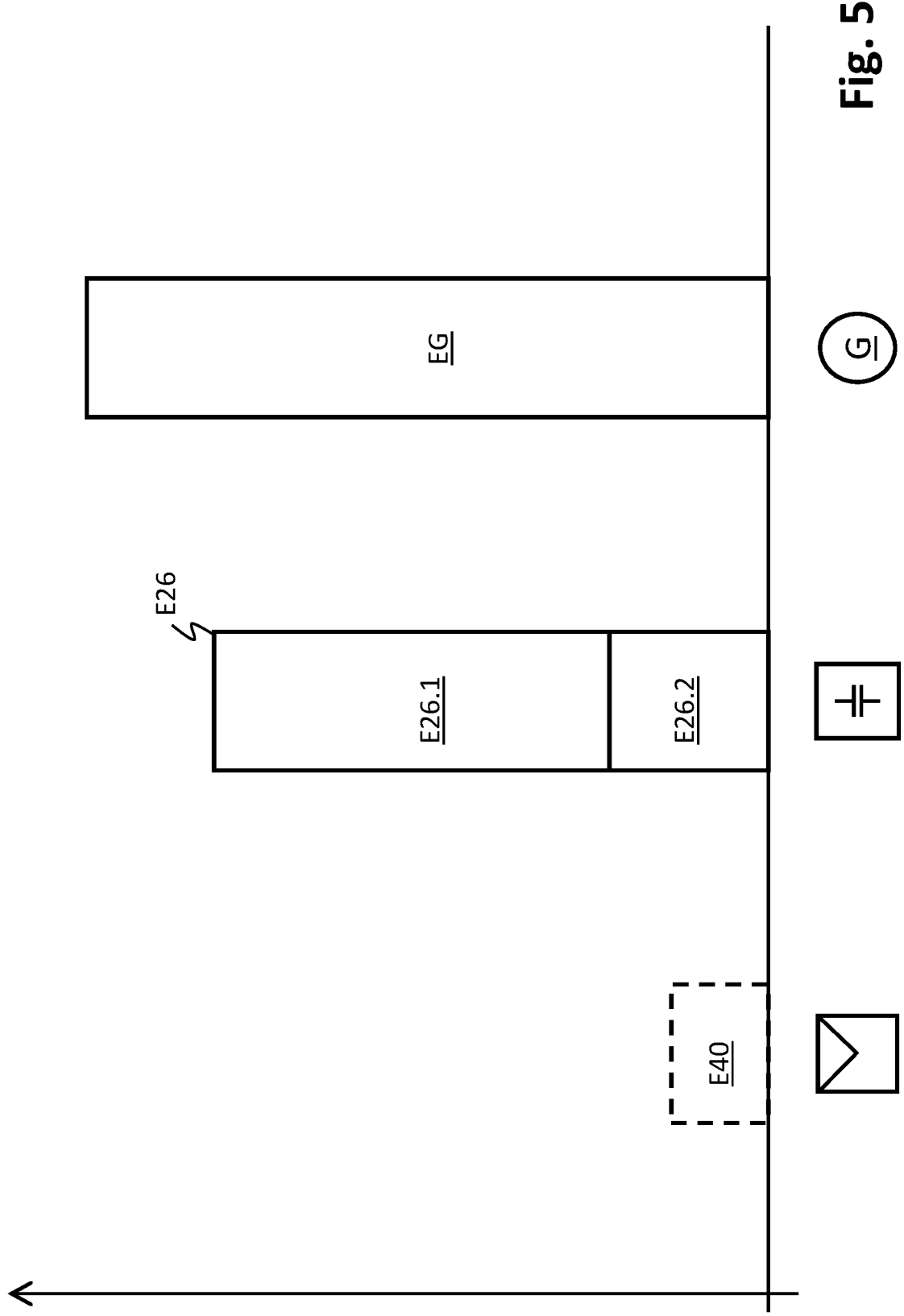

POWER CONVERTER AND METHOD FOR OPERATING A POWER CONVERTER

FIELD

This disclosure relates to the field of power converter technology, for example power converters coupled to a DC power storage, e.g. a battery, or hybrid power converters, which might optionally additionally be coupled to a photovoltaic generator (PV generator). The power converter provides a backup option to supply loads from energy stored in the DC power storage and/or optionally from energy provided by the PV generator, such that the loads are supplied with electrical power even for the case an AC-grid fails.

BACKGROUND

Power converters coupled to a DC power storage, e.g. a battery, are able to provide a backup function.

A battery inherently has only limited amount of energy stored. If battery systems are used during on-grid operation, i.e. when connected to an AC grid that supplies loads, for self-consumption increase, peak-load management or other functions, they will face the situation that the grid might fail arbitrarily. The battery may at that point in time be charged only partially. Known installations reserve a certain amount of energy stored in the battery for such backup case. If an installation shall provide backup frequently and/or for a longer period of time, it might be useful to add a small conventional generator instead of increasing the battery capacity. Hence, some installations provide backup solutions that comprise a switchover (manually or automatically) to another source like a backup generator (e.g., gas or fuel driven), switching off the power converter fed by the battery, and supplying the loads by the backup generator alone.

When using a switchover design comprising a power converter connected to a DC source (e.g., a battery or a combined battery and PV source) and e.g. a generator, the power converter does not provide power to the system in the backup case, while the generator supplies only loads that are connected to it. Batteries may not be recharged from generator power, and the generator may not feed power into the AC grid. Empty batteries can be charged from PV (in case of using a hybrid converter) or when the grid comes back. Furthermore, a generator typically creates a lot of noise and exhaust gas, and since it eventually operates partially or low loaded, the efficiency is not very high.

A backup solution wherein the generator is AC-coupled, i.e. directly connected to the AC loads, is rather complex and poses additional challenges. These relate to necessary control schemes of the power converter regarding charging and discharging in parallel to the generator. The loads as well as the generator may require special control schemes as well, depending on the actual design of the system, in particular regarding the switchover between on-grid and off-grid operation.

US patent application US 2016/0006254, par. [0032]-[0038], discloses a serial hybrid microgrid connected to a power grid and comprising a converter, an engine-powered generator, a non-dispatchable power source and optionally a battery, The generator and the power source supply electrical power to the converter, which is converted to AC power and fed into the microgrid via the converter. In case the power grid goes out of limits, the converter supplies the microgrid with electrical power drawn from the generator, the power source, and/or the battery, wherein the generator is preferably operated for maximum efficiency and allowed to vary output frequency and voltage over a range of at least 2% and 10% of its respective value.

SUMMARY

Disclosed is a power converter with an inverter that is configured to transform electrical power between a DC-side of the power converter and an AC-side of the power converter. The power converter comprises a first port and a second port arranged on the AC-side and a third port and a fourth port arranged on the DC-side of the power converter, wherein the first port is configured to be operatively connected to an AC-grid, the second port is configured to be operatively connected to an AC-load, the third port is configured to be operatively connected to an external power source, and the fourth port is configured to be operatively connected to a rechargeable DC-power storage. The power converter comprises a DC/DC-converter arranged between the third port and the inverter, which is configured to transfer electrical power provided by the external power source from the third port to the inverter. The inverter is configured to be grid forming and to provide electrical power to the second port in case of disconnection from the power supply at the first port. Grid-forming means that the inverter actively forms the voltage of the grid on its output side, i.e. the inverter does not rely on any given AC voltage but rather generates an AC voltage on its own, in particular in case there is none provided elsewhere, e.g. when the AC-grid fails or gets disconnected from the inverter. The power converter further comprises a control unit configured to monitor the third port and to detect parameters of the electrical power provided via the third port.

In an embodiment the control unit is configured to set parameters of the DC/DC-converter to suit the operation of the converter to the electrical power provided via the third port. The disclosure provides a power converter with an input via the third port for an external power source, which may be monitored by the control unit. This input allows to connect the external power source, e.g. a fuel driven AC generator or other source of electric power, to the converter, and to provide power from the generator to the second port and the AC loads connected to the second port in case power is not available from the first port of the inverter. The third port therefore acts like an emergency power input to the power converter. The disconnection from power supply at the first port might, for example, be due to a power outage of the AC-grid or a disconnection of the power converter from the AC-grid.

The third port, in one embodiment, is configured to be used with e.g. a plug and a cable to safely connect the external power source to the power converter. The third port, in one embodiment, is configured to be permanently connected with the external power source. However, if the external power source is permanently connected, it proves to be useful to provide an additional switch contact associated with the third port and used to start the external power source, e.g. generator. This is useful for so called auto-start generators, which might then be started via this additional contact of the third port. However, at least due to common grid regulations, in one embodiment it has to be assured that a start of the external power source is prevented as long as the inverter is connected to the AC-grid via the first port, for example, to prevent power from the external power source be fed into the AC grid.

The third port can accept AC or DC power within a wide range of parameters. The monitoring and controlling of the parameters of the power supplied to the third port might include, for example, monitoring and/or controlling the maximum current flowing via the third port and/or monitoring and/or controlling the frequency of AC-current flowing through the third port.

In an embodiment the power converter is configured to transfer electrical power provided by the DC-power storage via the fourth port to the inverter. In an embodiment the control unit is configured to monitor the fourth port and to set the parameters of the electrical power provided to the fourth port to suit the charging of the DC-power storage connected to the fourth port. Using power from the external power source and/or the power from the battery, the power converter may supply connected loads during backup operation and/or may charge the connected battery during on-grid operation and/or during backup operation.

In one embodiment, a solution is disclosed that may be implemented in a very simple and straightforward way and that allows to integrate especially a small generator, which might not have been specifically designed for parallel operation, as backup power source on a power converter, to be used during longer grid outages. It allows to facilitate a vast variety of AC and/or DC power sources in a backup system by taking advantage of the power control capabilities of the power converter, such that it does without any additional control means for this source. The power converter acts as the grid forming element while providing backup power to a load in absence of power from the AC-grid.

In an embodiment, the power converter may comprise a rectifier arranged between the third port and the DC/DC-converter. The third port might allow AC and/or DC input to the power converter. The power from the external power source can be rectified to DC power by the rectifier. The power from the external power source may then be transferred to a DC-link of the power converter using the DC/DC-converter, e.g. a buck or a boost converter or a buck-boost converter operating in buck or boost mode depending on the input voltage. In this embodiment, both the battery and the inverter are connected to this DC-link as well. When rectifying the power input via the third port by means of a rectifier, it is possible to operate the external power source with different, eventually variable frequency AC voltage, or even with DC input. Furthermore, a rectifier provides for inherent back feed protection, as no current will flow "backwards" from the power converter to the external power source. The DC/DC-converter is further controlled by the control unit regarding the power, for example, the current, drawn from the external power source, in order not to overload the source, for example, in terms of preventing an exceeding of the maximum current to be drawn via the third port without overloading from the external power source. Battery charge control, also performed by the control unit in one embodiment, may be implemented as well, in particular to control the state-of-charge of the battery as well as to prevent the battery from being over- or undercharged.

In an embodiment the power converter comprises on the DC-side a fifth port, which is configured to be operatively connected to a DC-power source, e.g., a PV generator. This configuration of a power converter may also be called a hybrid power converter.

In an embodiment, the power converter is configured to transfer electrical power provided by the DC-power source via the fifth port to the inverter. Furthermore, the power converter, in one embodiment, is configured to transfer electrical power provided by the DC-power source via the fifth port and/or by the external power source via the third port to the fourth port in a way suitable to recharge the DC-power storage.

In an embodiment the control unit is configured to monitor the first port, to detect a power supply outage of the AC-grid at the first port, and to disconnect the power converter from the AC-grid upon detection of a severe grid anomaly, for example a power outage. The disconnection may be achieved by a switch.

In an embodiment the control unit is configured to control operation of the power converter such that electrical power is transferred from the third port to the inverter only if the power converter is disconnected from the AC-grid, i.e. such that electrical power is prevented from being transferred from the external power source to the AC-grid or the load, as long as electrical power is transferred from the first port to the second port. The power converter may be disconnected from the AC-grid, for example, by opening a switch that connects the power converter to the AC-grid. However, this switch might be operated independently from the situation on the AC-grid. For example, if the AC-grid is back after an outage, the switch might still be held open, for example, if the DC-sources, battery, PV or the like, are still able to supply the load.

In an embodiment the power converter comprises two separate housings, wherein the first housing comprises the third port, the fourth port and a first AC interconnection terminal operatively connected to the AC output of the inverter. In this embodiment, the second housing comprises the first port, the second port and a second AC interconnection terminal, and the first and second AC interconnection terminals are operatively connected to each other. This allows to better separate the DC elements of the power converter from its AC elements and adds more flexibility in configuring the backup system to the actual needs of the loads to be securely supplied during backup.

This disclosure, in one embodiment, applies to power converters originally designed for batteries and/or as hybrid battery-PV converters, It provides a possibility to simply and cheaply integrate an external power source, e.g. a conventional emergency power generator that may be fuel or gas driven, into a backup system comprising a power converter serving as an interface for both, the battery and the power generator.

The disclosed power converter provides input protection for the third port, e.g. means for detecting and/or mitigating overcurrent, overload, short circuit, and/or back feed currents. It allows connecting an external power source, which might be an AC generator, to the DC-side of the power converter. The disclosure is designed to work in an (extended) emergency backup scenario, where the third port might be "blocked" as long as the AC grid is connected to the power converter and/or is in operation mode, i.e. able to provide enough power to operate the loads. The third port may be blocked for example by means of dedicated electrical switches, mechanical means, e.g. a secure "cap" blocking the input, by firmware, and/or by other means. The disclosure also teaches to provide means for preventing of a reconnection to the AC grid as long as the external power source operates, or even if the external power source is merely connected to the third port and thus may start operating at any time, e.g. manually. The control unit might provide signaling and/or disconnecting the external power source from the power converter when AC grid is available again.

The third port of the power converter might also be configured to receive electrical power input from another power converter, for example, a regulated emergency power output from this other power converter.

In embodiments of the power converter, the inverter has a nominal power in the range of 1 to 20 kW, for example, between 5 and 15 kW. The battery has a nominal size of 2 hours multiplied by the nominal power or the inverter, i.e. in the range of 2 to 40 kWh, for example, between 10 and 30 kWh. The optional PV generator has a nominal power of e.g. twice the nominal power of the inverter, i.e. in the range of 2 to 40 kW, for example, between 10 and 30 kW. The third port is for example configured for a nominal power in the range of 1 to 20 kW, for example, between 5 and 15 kW; a typical maximum current of the third port is rated at 16A AC and 240V AC, which enables the usage of standard AC technology between the external power source and the inverter, e.g. standard AC wires, plugs, protection means and the like.

A power converter according to another embodiment of this disclosure comprises an inverter configured to transfer electrical power between an AC-side of the power converter and a DC-side of the power converter. The power converter comprises a first port and a second port arranged on the AC-side and a third port and a fourth port arranged on the DC-side of the power converter, wherein the first port is configured to be operatively connected to an AC-grid, the second port is configured to be operatively connected to an AC-load, the third port is configured to be operatively connected to an external power source, and the fourth port is configured to be operatively connected to a rechargeable DC-power storage. The power converter comprises a DC/DC-converter arranged between the third port and the inverter, which is configured to transfer electrical power between the third port and the inverter if the power converter is disconnected from the AC-grid.

A method for operating such a power converter comprises monitoring the third port, detecting parameters of the electrical power supplied via the third port, and setting parameters of the DC/DC-converter to suit the electrical power provided via the third port.

In an embodiment, the DC/DC-converter arranged between the third port and the inverter is configured to transfer electrical power between the third port and the inverter only if the power converter is disconnected from the AC-grid.

In an embodiment the method comprises monitoring the first port, detecting an outage of power supply at the first port, and, in case of an outage of power supply at the first port, providing electrical power from the third port to the second port via the inverter.

In an embodiment the method comprises detecting a recovery of power supply at the first port, and, in case of a recovery of power supply at the first port, providing electrical power from the first port to the second port.

A power converter according to another embodiment comprises an inverter configured to transfer electrical power between an AC-side of the power converter and a DC-side of the power converter. The power converter comprises a first port and a second port arranged on the AC-side and a third port and a fourth port arranged on the DC-side of the power converter, wherein the first port is configured to be operatively connected to an AC-grid, the second port is configured to be operatively connected to an AC-load, the third port is configured to be operatively connected to an external power source, and the fourth port is configured to be operatively connected to a rechargeable DC-power storage. The power converter comprises a first switch arranged between the first port and the inverter and a second switch arranged between the second port and the inverter. A method for operating such a power converter comprises operating the power converter in a first mode, in which the first switch is closed, the second switch is open, and electrical power is transferred from the first port to the second port; and operating the power converter in a second mode, in which the first switch is open, the second switch is closed, and electrical power is transferred from the inverter to the second port.

The first mode may be called a normal operation mode, wherein the load is supplied with electrical power from the AC-grid. The second mode may be called a backup mode, wherein the load is supplied with electrical power by the power converter.

In an embodiment, the method further comprises operating the power converter in a third mode, in which the first switch and the second switch are closed and in which electrical power is transferred from the first port to the second port, from the first port to the inverter, and/or from the inverter to the second port. This third mode may be called a grid-parallel mode.

In an embodiment, electrical power is transferred from the first port to the fourth port in the third mode, the electrical power thus transferred being suitable to charge the DC-power storage from the AC-grid.

In an embodiment, the power converter comprises a third switch arranged between the external power source and the inverter, the third switch being open during operation in the first mode and in the third mode. The third switch may enable or disable the operation of the external power source which might be connected to the third port. The third switch might electrically disconnect the external power source associated to the third port of the power converter.

In an embodiment of the method, the third switch is closed after switching into the second mode, and electrical power is transferred from the third port to the inverter in the second mode after closing the third switch, wherein the third switch is opened before switching from operation in the second mode to operation in the first mode or to operation in the third mode. This enables to comply with requirements of power converters, especially those operating a PV generator and being connected to the AC-grid. For such AC-grid connected power converters, it should be avoided to have them feed-in power from an external power generator into the AC-grid, e.g. due to grid regulations only allowing renewable energy to be fed into the AC-grid. Hence, the disclosed power converter allows for different grid requirements to be complied with.

In an embodiment, the power converter may comprise a switch to activate an external power source comprising an autostart function, e.g. a so called autostart generator. Such a switch could for example be a dry contact operated by the control unit, the operation, for example, considering the battery state-of-charge condition. Additionally, or alternatively, such switch could be used to provide a signal used to start the external power source. The external power generator may as well be started manually, however, in this case the power converter would have to be disconnected from the AC-grid upon start of the external power generator.

In an embodiment, the control unit is configured to start the external power source, e.g. generator automatically, if the battery state of charge falls below a first adjustable threshold. The control unit could also be configured to stop the external power source, e.g. generator, when the battery state of charge reaches a second adjustable threshold or when the battery is fully charged. In one embodiment, the second threshold is higher than the first threshold.

The power converter might comprise a communication interface which might comprise a user interface to communicate with the user. The user might receive signals via this user interface, or input information into the power converter via this user interface. The communication interface might further comprise a communication module for remote communication. Via this communication module, the user might be provided information, e.g. via mobile device, and interface with the system. The user might for example receive warning messages, blackout duration/state-of-charge relation data, estimated backup capacity data, and the like. Via the communication interface, a start and/or stop signal might be received by the power converter and issued to the generator directly or via the control unit of the power converter. The communication with the power converter via the communication interface might be done by the user remotely and/or via the user interface. Via the communication interface, the power converter might also output a signal, that the AC-grid supply is restored.

A power converter according to the disclosure thus may provide backup power using a solution that provides a third port to connect an external power source, e.g. an external power generator, when the AC-grid is disconnected, wherein the power converter, via its third port, works with external power generators comprising a wide range of electrical power parameters and accommodates multi-format input with a frequency in the range of 0 to 200 Hz, for example, AC power between 40 and 70 Hz, and a voltage in the range of 12 to 400 V, for example, between 40 and 300 V.

The third port of the power inverter according to the disclosure allows for electrical power to be input from a conventional, in particular low-cost, optionally fuel or gas driven generator. Furthermore, a SPS (secure power supply) outlet of another power converter might be connected to the third port. This proves particularly useful if power is available from a power converter of a power supply facility, e.g. a PV plant, located at an adjacent property.

BRIEF DESCRIPTION OF THE DRAWINGS

The disclosure will be described in more detail with reference to the accompanying drawings, wherein:

FIG. 5 schematically shows energy available from different elements connectable to a power converter.

DETAILED DESCRIPTION

Figure 1:
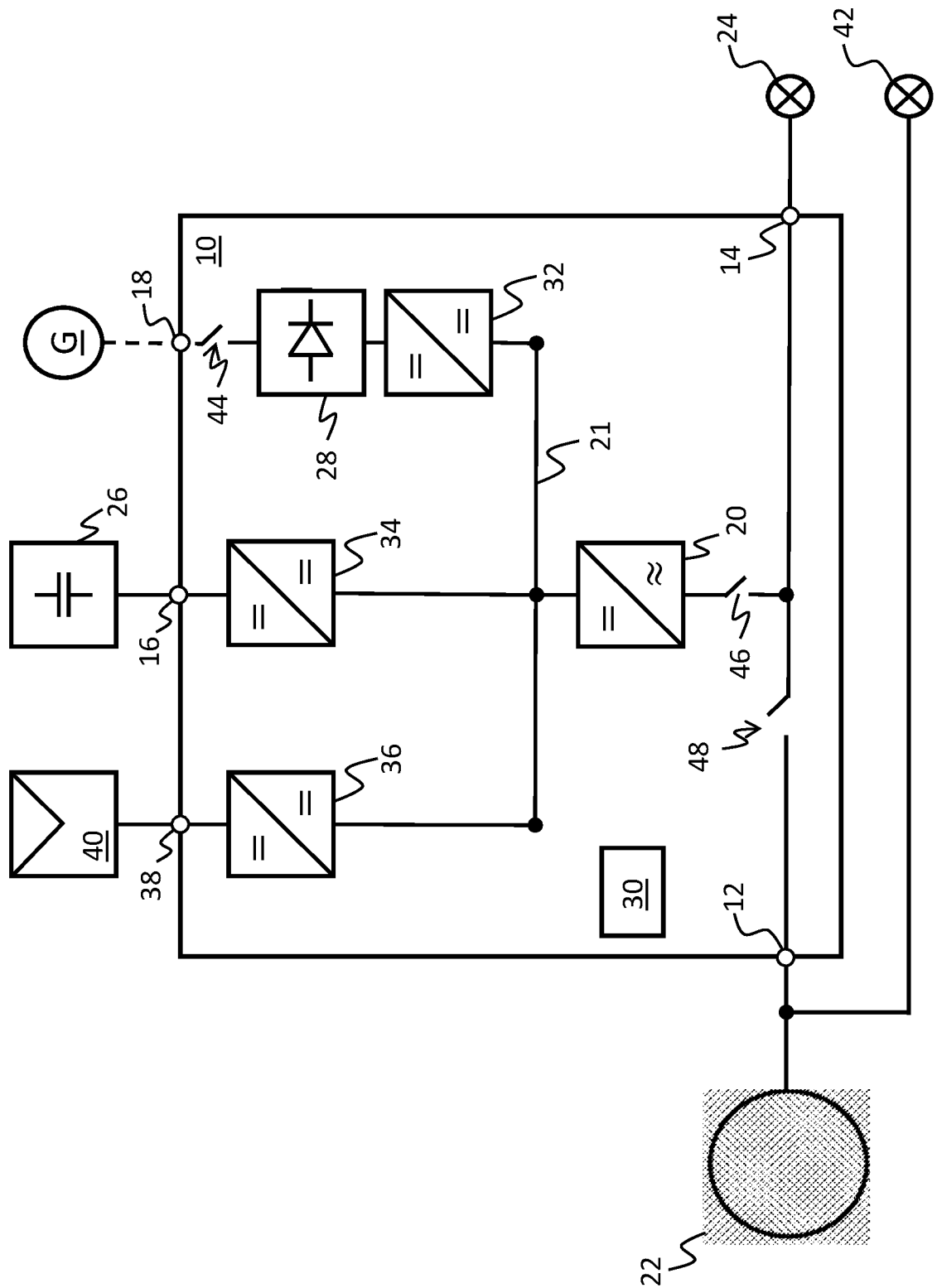
FIG. 1 schematically shows an embodiment of a power converter.

FIG. 1 shows a power converter 10 comprising an inverter 20. The inverter 20 is configured to transform DC-power to AC-power. Such power conversion might, for example, be realized using several semiconductor switches in a known inverter bridge configuration. A DC side of the inverter 20 is connected to a DC-link for DC power input or output. An AC side of the inverter 20 configured to receive AC power or to output AC power.

A first port 12 of the power converter 10 is connected to an AC-grid 22. A second port of the power converter 10 is connected to a load 24 which is to be supplied with electrical power reliably, e.g. using backup electrical power during an outage of the AC-grid 22. A first switch 48 is arranged between the first port 12 and the inverter 20. The AC-grid 22 may be disconnected from the power converter 10 using this first switch 48. A second switch 46 is arranged between the second port 14 and the inverter 20. The second switch 46 is also arranged between the inverter 20 and the first switch 48. The AC-side of the inverter 20 may be disconnected from the load 24 using the second switch 46. The inverter 20 may also be disconnected from any connection on its AC side using the second switch 46. A load 42 is connected to the AC-grid 22 directly.

The power converter 10 comprises a third port 18, which is operatively connectable to an external power source G, e.g. a conventional fuel or gas driven combustion engine. The external power source G can be grid forming, i.e. it is capable of supplying power to a load directly and does not depend to be connected to a grid with a given grid voltage to operate. The external power source G connected to the third port 18 can be disconnected from the power converter 10 via a third switch 44. A rectifier 28 and a DC/DC-converter 32 are arranged between the third switch 44 and the DC-link 21. The rectifier 28 can rectify AC electrical power entering the power converter 10 via the third port 18 and provide rectified DC power to the DC/DC-converter 32. The DC/DC-converter 32 can adapt the output of the rectifier 28 to the voltage of the DC-link 21.

A DC power storage 26 is connected to a fourth port 16. A DC/DC-converter 34 may be arranged in between the fourth port and the DC-link 21. The DC power storage 26 may be charged or discharged via the fourth port 16.

The inverter 20 is configured to transfer power between the AC side and the DC side of the power converter 10. Discharging of the DC power storage 26 may occur when the load 24 is supplied with electrical power from the DC power storage 26 via the inverter 20. Charging may occur via the DC-link 21, when an external power source G supplies electrical power, or via the inverter 20, when the AC-grid 22 supplies electrical power. In one embodiment, in case that the AC-grid 22 operates properly, electrical power may be taken from the AC-grid 22 to charge the DC power storage 26, or taken from the DC power storage 26 to (additionally) supply the load 24. On the other hand, in case the AC-grid 22 is not operating properly, e.g. during backup operation (also called backup mode M2, cf. FIG. 4), the inverter 20 supplies the load 24 with electrical power exclusively, i.e. without taking power from the AC-grid 22.

Via an optional fifth port 38, a DC power source, in particular a PV array 40 may be connected to the DC-link 21 by means of a direct connection or via a DC/DC-converter 36. The PV array 40 may charge the DC power storage 26 via the DC-link 21. The PV array 40 may also provide backup power to the load 24 via the DC-link 21 and the inverter 20, e.g. in backup mode operation of the power converter 10. Furthermore, the PV array 40 may provide power to be fed into the AC-grid 22, e.g. during normal operation of the AC-grid 22.

A control unit 30 may control the operation of the inverter 20. In particular, the control unit 30 controls the power drawn by the power converter 10 from the external power source G via the third port 18 during backup operation. The switches 44, 46, 48 may be controlled by the control unit 30 and/or switched from outside the power converter 10, either manually or automatically. The control unit 30 may implement a method for operating the power converter 10, for example, one of the methods described below. In particular, if the AC-grid 22 is not available for whatever reason or and/or disconnected from the inverter 20, the control unit 30 may operate the power converter 10 in a way to combine the electrical power from the external power source G via the DC link 21 with power from the DC power storage 26 and optionally from the PV array 40, and to supply the load 24 with AC power in a grid forming way during backup operation. Furthermore, the control unit 30 may operate the power converter 10 in a way to combine the electrical power from the external power source G, optionally from the PV array 40 via the DC link 21, and from the AC-grid 22 if available, to charge the DC power storage 26.

Figure 2:
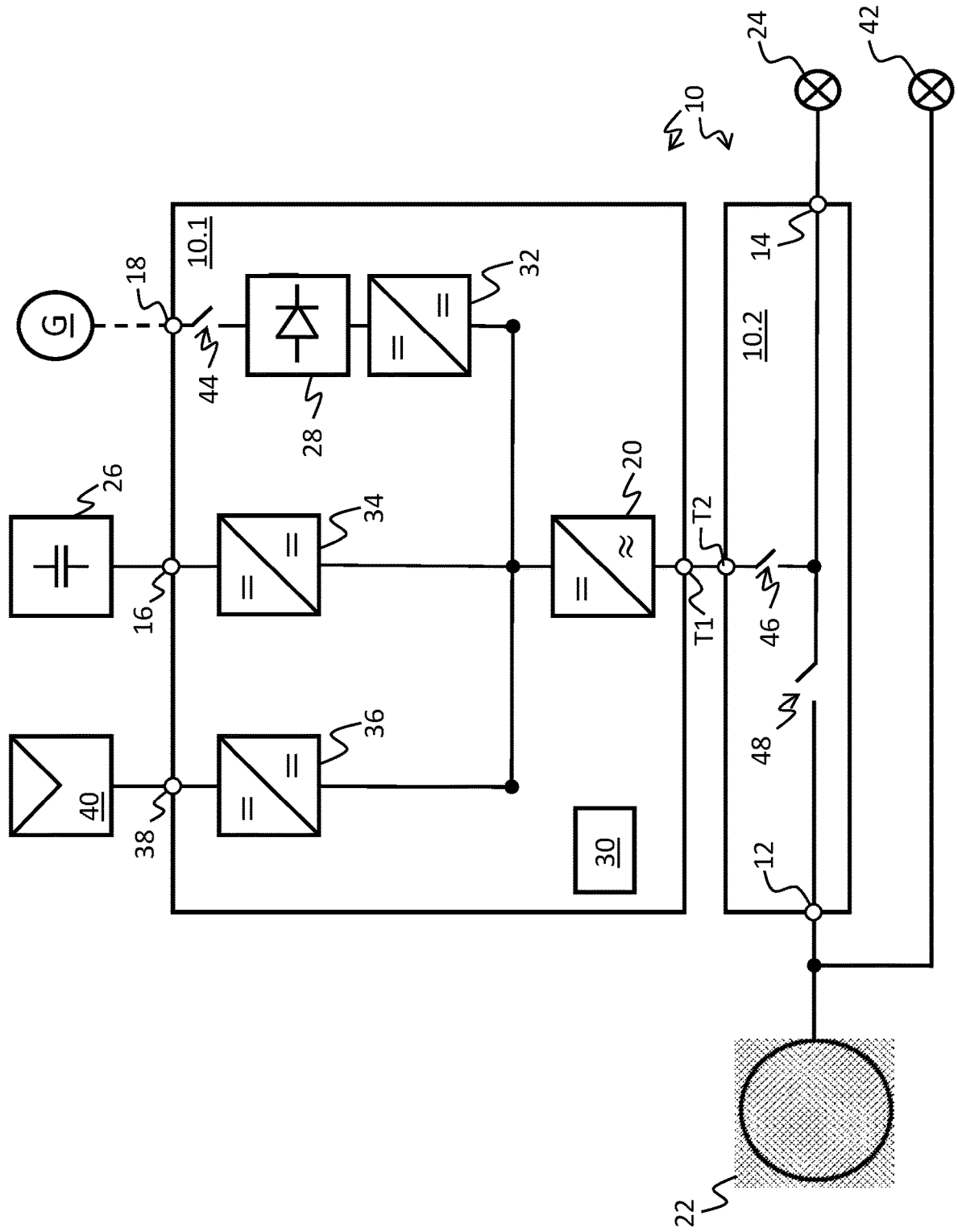
FIG. 2 schematically shows an embodiment of a power converter.

FIG. 2 shows another embodiment of the power converter 10. Elements of this embodiment with the same or a similar function as in the embodiment described in connection with FIG. 1 carry the same reference signs as in FIG. 1. In the embodiment of FIG. 2, the power converter 10 comprises two separate housings 10.1, 10.2. The first housing 10.1 comprises the third port 18, the fourth port 16 and a first AC interconnection terminal T1 operatively connected to the AC output of the inverter 20. The first housing 10.1 further comprises the inverter 20, the control unit 30, the rectifier 28 and the DC/DC-converter 32, 34, 35. The second housing 10.2 comprises the first port 12, the second port 14 and a second AC interconnection terminal T2, wherein the first and second AC interconnection terminals T1, T2 are operatively connected to each other.

Figure 3:
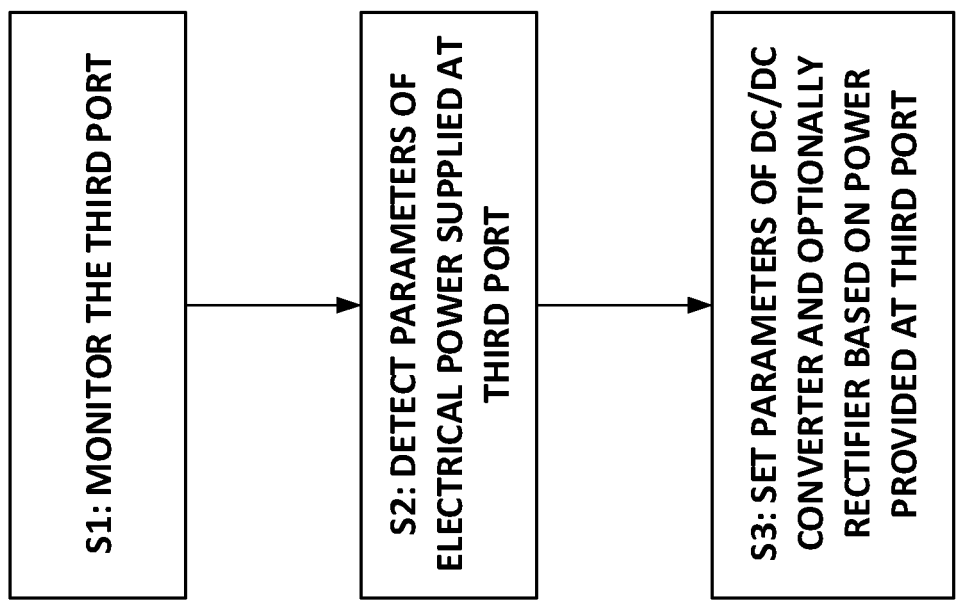
FIG. 3 schematically shows an embodiment of a method for operating a power converter.

In FIG. 3 a method for operating the power converter 10 is shown. At S1, the third port 18 is monitored and at S2 parameters of the electrical power supplied via the third port 18 are detected. At S3, the parameters of the DC/DC-converter 32 and optionally the rectifier 28 are set to suit the electrical power provided via the third port 18. In one embodiment this method is performed by the control unit 30 of the power converter 10. The control unit 30 is configured to monitor the connection or disconnection of the AC-grid 22 from the power converter 10. The disconnection might be due to the first switch 48 being open and/or due to a power outage on the AC-grid 22. The control unit 30 is configured to detect either form of disconnection. The control unit 30 is configured to control the DC/DC converter 32 such that electrical power is transferred via the DC/DC-converter 32 between the third port 18 and the inverter 20 if the power converter 10 is disconnected from the AC-grid 22. The control unit 30 is configured to control the DC/DC-converter 32 to ensure that a disconnection from the AC-grid 22, for example, through an open first switch 48 and/or an outage of the AC-grid 22, is detected before electrical power is transferred from the third port 18 to the inverter 20.

Figure 4:
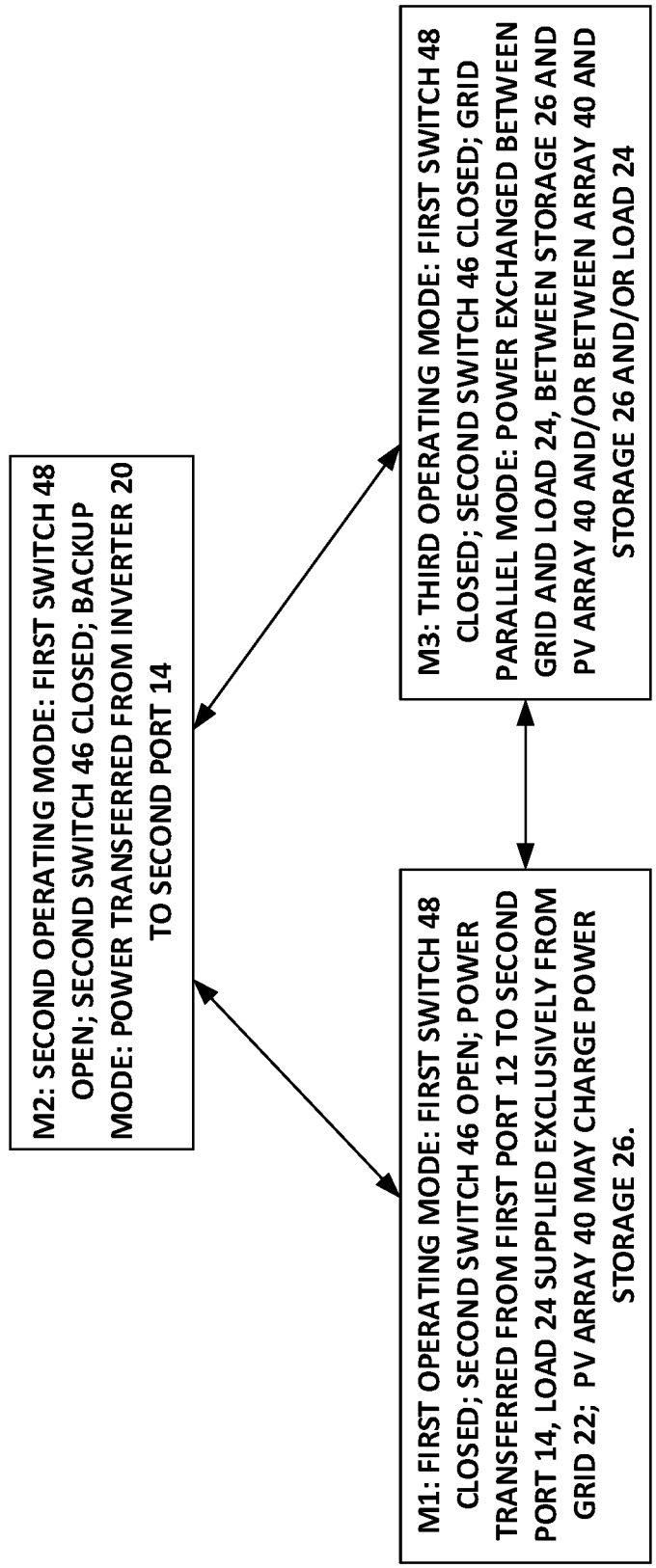
FIG. 4 schematically shows an embodiment of a method for operating a power converter.

To further describe the above operating options, FIG. 4 shows a method with three modes M1, M2, M3 of operating a power converter 10 is shown. The operating modes M1, M2, M3 depend on the state of the switches 46, 48.

In a first operating mode M1 of the power converter 10, the first switch 48 is closed and the second switch 46 is open. In this first operating mode M1, electrical power is transferred from the first port 12 to the second port 14, i.e. the load 24 is supplied with electrical power from the AC-grid 22 exclusively. The inverter 20 may be in stand-by mode with regard to its AC connection, while the DC-power source 40 optionally may charge the DC-power storage 26 via the DC-link 21 and optionally the DC/DC-converters 34, 36.

In a second operating mode M2, the first switch 48 is open and the second switch 46 is closed. In this second operating mode M2, the so-called backup mode, electrical power is transferred from the inverter 20 to the second port 14, via which the load 24 is supplied with electrical power. The electrical power might be provided to the DC side of the inverter 20 from the external power source G, the DC power storage 26 and/or the PV array 40.

In a third operating mode M3 the first switch 48 is closed and the second switch 46 is closed. In this third operating mode M3, the power converter operates in a so-called grid-parallel mode. Electrical power is exchanged between the AC-grid 22 and the load 24, between the DC power storage 26 and the PV array 40, and optionally between the PV array 40 and the AC-grid 22 and/or the load 24. The PV array 40 may thus charge the DC power storage 26 and/or supply electrical power to the load 24.

The load 24 draws power from the AC-grid 22 during on-grid operation, e.g. with switch 48 being closed; the second switch 46 may be closed or open, such that converter operates in grid-parallel mode M3 or autonomously in mode M1, respectively. In case of an outage of the AC grid 22, switch 48 might open and disconnect the power converter 10 as well as the load 24 from the AC grid 22. This is backup operation in operating mode M2, comprising the second switch 46 being closed and the load 24 being supplied from the power converter 10.

The load 42, on the other hand, is supplied from the AC-grid 22 directly and thus only if the AC-grid 22 is available; hence, load 42 may not be supplied at all when the grid is not available, e.g. during backup operation mode M2.

In one embodiment it is possible to implement a blocking means that prevents a change from backup mode M2 to grid-parallel mode M3 as long as power is drawn via the third port 18. For example, upon re-availability of the AC-grid 22, the first switch 48 is prevented from being closed if an external power source G is connected to the third port 18 and if the third switch 44 is closed. Instead of closing switch 48 immediately, prior to that closing either the external power source G has to be disconnected from the third port 18, or the third switch 44 has to be opened. Such blocking of certain transitions between the individual modes M1, M2, M3 might, for example, be performed by the control unit 30 as well.

Optionally, e.g. due to grid regulations, it may be necessary to prevent transferring power from the third port 18 to the AC-grid 22 or to the load 24, or even to just connect an external power source G to the third port 18, as long as the AC-grid 22 is operating properly and is connected to the power converter 10. The control unit 30 may be configured to ensure this prevention.

FIG. 5 shows schematically an example of amounts of energy E40, E26, EG that could be provided by each of the energy sources G, 26 and 40.

Looking at the energy E26 stored in the DC power storage 26, a part E26.1 of the energy E26 may be used during on-grid operation of the power converter 10, e.g. to perform load balancing, for peak-load management, and/or for self-consumption increase, or for other functions during on-grid mode. Another part E26.2 of the energy E26 stored in the DC power storage 26 might be reserved to supply the load 24 during operation in backup mode. The amount of energy E26.2 saved for backup mode operation might be chosen to last e.g. 0.5 to 2 hours at nominal power of the power converter 10. The smaller the load 24, the longer the anticipated backup time, and the more PV energy E40 available, the longer the external power source G is not needed.

The energy E40 provided by the DC-power source 40 is an estimation over a certain amount of time, e.g. one typical day.

A blackout duration prognosis method might also be implemented by the control unit 30. For this, an estimation is made, how long the blackout probably would be, and this is related to the state-of-charge of the battery 26 and the power drawn by the load 24. If the prognosis yields higher backup energy demand than the sum of the energy E26 available in the battery 26 and the energy E40 that could be—according to an estimation—provided by the DC-power source 40, some energy has to be input via the third port 18 to close the respective gap.

A warning message could be issued if the estimated backup energy demand outruns battery 26 state-of-charge, such that user has enough time left to connect and/or start the external power source G.

A start signal for the external power source G, e.g. a generator, might be generated for starting the external power source G, e.g. if the estimated blackout duration exceeds a certain threshold. The start signal may be generated by the control unit 30 and may be communicated via a data line or by a multipurpose control relay to the external power source G, e.g. generator, connected to the third port 18.

The power converter 10 is not connected to the AC-grid 22 again as long as the external power source G is up and running, i.e. as long as power is transferred from the external power source G via the inverter 20 to any of the first port 12 or the second port 14. In other words, the external power generator G may be used during backup operation only.

The invention claimed is:

1. A power converter with an inverter configured to transform electrical power between a DC-side of the power converter and an AC-side of the power converter, wherein the power converter comprises:
    a first port and a second port arranged on the AC-side of the power converter; and
    a third port and a fourth port arranged on the DC-side of the power converter,
    wherein the first port is configured to be operatively connected to an AC-grid, the second port is configured to be operatively connected to an AC-load, the third port is configured to be operatively connected to an external power source, and the fourth port is configured to be operatively connected to a rechargeable DC-power storage, and
    wherein the power converter comprises a DC/DC-converter arranged between the third port and the inverter, which is configured to transfer electrical power provided by the external power source from the third port to the inverter, and wherein the inverter is configured to be grid forming and to provide electrical power to the second port in case of disconnection from the AC-grid at the first port,
    the power converter further comprising a control unit configured to monitor the third port and to detect parameters of electrical power provided via the third port,
    wherein the control unit is configured to control operation of the power converter such that electrical power is prevented from being transferred from the external power source to the AC-grid or the AC-load as long as electrical power is transferred from the first port to the second port.

2. The power converter according to claim 1, further comprising a rectifier arranged between the third port and the DC/DC-converter.

3. The power converter according to claim 1, the control unit being configured to set parameters of the DC/DC-converter to suit an operation of the power converter to the electrical power provided via the third port.

4. The power converter according to claim 1, configured to transfer electrical power provided by the DC-power storage from the fourth port to the inverter.

5. The power converter according to claim 1, the control unit being configured to monitor the fourth port and to set parameters of the electrical power provided to the fourth port to suit a charging of the DC-power storage operatively connected to the fourth port.

6. The power converter according to claim 1, further comprising on the DC-side a fifth port, which is configured to be operatively connected to a DC-power source.

7. The power converter according to claim 6, configured to transfer electrical power provided by the DC-power source from the fifth port to the inverter and/or from the third port to the fourth port in a way suitable to recharge the DC-power storage.

8. The power converter according to claim 1, the control unit being configured to monitor the first port, to detect a power supply outage of the AC-grid at the first port, and to disconnect the power converter from the AC-grid upon detection of a power outage.

9. The power converter according to claim 8, wherein the control unit is configured to control operation of the power converter such that electrical power is transferred from the third port to the inverter only if the power converter is disconnected from the AC-grid.

10. The power converter according to claim 1, wherein the power converter comprises two separate housings, wherein a first housing of the two separate housing comprises the third port, the fourth port and a first AC interconnection terminal operatively connected to an AC output of the inverter, wherein a second housing of the two separate housings comprises the first port, the second port and a second AC interconnection terminal, wherein the first and second AC interconnection terminals are operatively connected to each other.

11. The power converter according to claim 1, wherein the third port is configured to be connected to an AC power source.

12. A method for operating a power converter with an inverter configured to transfer electrical power between an AC-side of the power converter and a DC-side of the power converter, wherein the power converter comprises a first port and a second port arranged on the AC-side of the power converter, and a third port and a fourth port arranged on the DC-side of the power converter, wherein the first port is configured to be operatively connected to an AC-grid, the second port is configured to be operatively connected to an AC-load, the third port is configured to be operatively connected to an external power source, and the fourth port is configured to be operatively connected to a rechargeable DC-power storage, and wherein the power converter comprises a DC/DC-converter arranged between the third port and the inverter, wherein the power converter is configured to transfer electrical power via the DC/DC-converter between the third port and the inverter if the power converter is disconnected from the AC-grid, the method comprising:
    monitoring the third port;
    detecting parameters of the electrical power supplied via the third port;
    setting parameters of the DC/DC-converter to suit the electrical power provided via the third port based on the detected parameters; and
    controlling an operation of the power converter such that electrical power is prevented from being transferred from the external power source to the AC-grid or the AC-load when electrical power is transferred from the first port to the second port.

13. The method according to claim 12, further comprising:
monitoring the first port;
detecting an outage of power supply at the first port; and
in case of an outage of power supply detected at the first port, providing electrical power from the third port to the second port via the inverter.

14. The method according to claim 13, further comprising:
detecting a recovery of power supply at the first port; and
in case of a recovery of power supply at the first port, providing electrical power from the first port to the second port.

15. A method for operating a power converter with an inverter configured to transfer electrical power between an AC-side of the power converter and a DC-side of the power converter, wherein the power converter comprises a first port and a second port arranged on the AC-side of the power converter, and a third port and a fourth port arranged on the DC-side of the power converter, wherein the first port is configured to be operatively connected to an AC-grid, the second port is configured to be operatively connected to an AC-load, the third port is configured to be operatively connected to an external power source, and the fourth port is configured to be operatively connected to a rechargeable DC-power storage, wherein the power converter comprises a first switch arranged between the first port and the inverter and a second switch arranged between the second port and the inverter, the method comprising:
operating the power converter in a first mode, in which the first switch is closed, and the second switch is open and in which electrical power is transferred from the first port to the second port; and
operating the power converter in a second mode, in which the first switch is open, and the second switch is closed and in which electrical power is transferred from the inverter to the second port.

16. The method according to claim 15, further comprising operating the power converter in a third mode, in which the first switch and the second switch are closed and in which electrical power is transferred from the first port to the second port, from the first port to the inverter, and/or from the inverter to the second port.

17. The method according to claim 15, wherein in the third mode electrical power is transferred from the first port to the fourth port, and wherein the electrical power is suitable to charge the DC-power storage from the AC-grid.

18. The method according to claim 15, wherein the power converter comprises a third switch arranged between the third port and the inverter, the third switch being open during operation in the first mode and in the third mode.

19. The method according to claim 18, wherein the third switch is closed after switching into the second mode, and electrical power is transferred from the third port to the inverter in the second mode after closing the third switch, wherein the third switch is opened before switching from operation in the second mode to operation in the first mode or to operation in the third mode.

20. The method according to claim 15, wherein the power converter comprises a fifth port arranged on the DC-side of the power converter, the fifth port being configured to be operatively connected to a DC-power source, wherein in the first mode, electrical power provided by the DC-power source is transferred from the fifth port to the fourth port in a way suitable to recharge the DC-power storage, and wherein in the second mode and/or in the third mode electrical power provided by the DC-power source is transferred from the fifth port to the first port and/or to the second port in a way suitable to be fed into the AC-grid or to supply the AC-load, respectively.

* * * * *